(12) United States Patent
Austin et al.

(10) Patent No.: US 12,436,903 B2
(45) Date of Patent: Oct. 7, 2025

(54) SYSTEM AND METHOD FOR STRUCTURED CABLING FOR HIGH-SPEED CONNECTIVITY AMONG DATA CENTERS

(71) Applicant: JPMorgan Chase Bank, N.A., New York, NY (US)

(72) Inventors: Paul Austin, Lewis Center, OH (US); Ryan Boles, Ostrander, OH (US); Sharon Zakashefski, Middlesex, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 321 days.

(21) Appl. No.: 18/198,467

(22) Filed: May 17, 2023

(65) Prior Publication Data

US 2023/0376428 A1 Nov. 23, 2023

Related U.S. Application Data

(60) Provisional application No. 63/364,979, filed on May 19, 2022.

(51) Int. Cl.
*G06F 13/16* (2006.01)
(52) U.S. Cl.
CPC ................ *G06F 13/1668* (2013.01)

(58) Field of Classification Search
CPC .................................................. G06F 13/1668
See application file for complete search history.

(56) References Cited

U.S. PATENT DOCUMENTS

2022/0043226 A1* 2/2022 Andrus ............... G02B 6/4413
2024/0175170 A1* 5/2024 Joshi ..................... H04L 41/12

* cited by examiner

*Primary Examiner* — Suraj M Joshi
(74) *Attorney, Agent, or Firm* — GREENBLUM & BERNSTEIN, P.L.C.

(57) ABSTRACT

Various methods, apparatuses/systems, and media implementing a structured cabling connectivity module for providing high-speed data connectivity are disclosed. The system includes a processor; and a memory operatively connected to the processor via a communication interface. The processor receives requirements and design data for providing a complete end-to-end cabling connection among a plurality of data centers corresponding to a predefined network environment; generates connectivity link data based on the received requirements and design data; identifies a first predefined length data for cabling between two hardware components within a same data center zone; identifies a second predefined length data for cabling between a hardware component of a first data center zone and a hardware component of a second data center zone; and establishes a communication link among the plurality of data centers by implementing the identified first predefined length data and the second predefined length data.

20 Claims, 11 Drawing Sheets

FIG. 10

SYSTEM AND METHOD FOR STRUCTURED CABLING FOR HIGH-SPEED CONNECTIVITY AMONG DATA CENTERS

CROSS-REFERENCE TO RELATED APPLICATIONS

This application claims the benefit of priority from U.S. Provisional Patent Application No. 63/364,979, filed May 19, 2022, which is herein incorporated by reference in its entirety.

TECHNICAL FIELD

This disclosure generally relates to data centers, and, more particularly, to methods and apparatuses for implementing a structured cabling connectivity module configured to provide high speed connectivity for data centers.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, a wide variety of business functions are commonly supported by software applications and tools, i.e., business intelligence (BI) tools. For instance, software has been directed to data monitoring, performance analysis, project tracking, and competitive analysis, to name but a few. Over the years, computer manufacturers have provided processing architectures based on a multi-system shared data approach. Through these architectures, multiple large-scale computer systems (i.e., data centers, servers, etc.), each of which is often referred to as a computer processing complex (CPC) or a central electronic complex (CEC), may be interconnected, through, for example, a coupling facility or other inter-processor communication mechanism, to permit each such system to gain read-write access to data residing on one or more shared input/output devices. The resulting inter-connected computer system is commonly referred to as a "sysplex".

For example, mainframe sysplex technology utilizes a high-speed data bus (PCIe GEN4) for hardware-to-hardware clustering. The vendor's stated qualifications for support required the deployment of proprietary point-to-point fiber connections between mainframe hardware components. A point-to-point cabling solution for an ever-expanding footprint may prove to be very undesirable for many reasons, including scalability, redundancy, and cost efficiency. Existing restrictions in cabling do not allow scaling the hardware footprints in either horizontally or vertically easily within a hardware-to-hardware clustering network.

Thus, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic structured cabling connectivity module configured to provide high speed connectivity for data centers in an automated and scaled fashion, thereby improving structure, control, problem diagnosis, and resiliency for mainframe solutions and allowing robust transmission and reception of data among data centers, but the disclosure is not limited thereto.

According to exemplary embodiments, a method for implementing a structured cabling connectivity module for providing high-speed data connectivity by utilizing one or more processors along with allocated memory is disclosed. The method may include: receiving requirements and design data for providing a complete end-to-end cabling connection among a plurality of data centers corresponding to a predefined network environment; generating connectivity link data based on the received requirements and design data; identifying a first predefined length data for cabling between two hardware components within a same data center zone; identifying a second predefined length data for cabling between a hardware component of a first data center zone and a hardware component of a second data center zone; and establishing a communication link among the plurality of data centers by implementing the identified first predefined length data and the second predefined length data.

According to exemplary embodiments, the predefined network environment may be a mainframe network environment for supporting mainframe systems, but the disclosure is not limited thereto.

According to exemplary embodiments, the requirements and design data may include data related to connection procedures, topologies and channel certifications of connection length of cables required to provide the complete end-to-end cabling connection among the plurality of data centers, but the disclosure is not limited thereto.

According to exemplary embodiments, the first predefined length data for cabling may be 85 meters of total length of cabling, but the disclosure is not limited thereto.

According to exemplary embodiments, a link between hardware components within the same data center zone may include two mated pairs, but the disclosure is not limited thereto.

According to exemplary embodiments, the second first predefined length data for cabling may be 130 meters of total length of cabling, but the disclosure is not limited thereto.

According to exemplary embodiments, a link between the hardware component of the first data center zone and the hardware component of the second data center zone may include four mated pairs, but the disclosure is not limited thereto.

According to exemplary embodiments, the first data center zone and the second data center zone may be physically separated in different buildings.

According to exemplary embodiments, a system for implementing a structured cabling connectivity module for providing high-speed data connectivity is disclosed. The system may include: a processor; and a memory operatively connected to the processor via a communication interface, the memory storing computer readable instructions, when executed, may cause the processor to: receive requirements and design data for providing a complete end-to-end cabling connection among a plurality of data centers corresponding to a predefined network environment; generate connectivity link data based on the received requirements and design data; identify a first predefined length data for cabling between two hardware components within a same data center zone; identify a second predefined length data for cabling between a hardware component of a first data center zone and a hardware component of a second data center zone; and establish a communication link among the plurality of data centers by implementing the identified first predefined length data and the second predefined length data.

According to exemplary embodiments, a non-transitory computer readable medium configured to store instructions for implementing a structured cabling connectivity module for providing high-speed data connectivity is disclosed. The instructions, when executed, may cause a processor to perform the following: receiving requirements and design data for providing a complete end-to-end cabling connection among a plurality of data centers corresponding to a predefined network environment; generating connectivity link data based on the received requirements and design data; identifying a first predefined length data for cabling between two hardware components within a same data center zone; identifying a second predefined length data for cabling between a hardware component of a first data center zone and a hardware component of a second data center zone; and establishing a communication link among the plurality of data centers by implementing the identified first predefined length data and the second predefined length data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 10 illustrates an exemplary first test of the test overview of FIG. 9 implemented by the platform and language agnostic structured cabling connectivity module of FIG. 4 in accordance with an exemplary embodiment.

DETAILED DESCRIPTION

Figure 1:
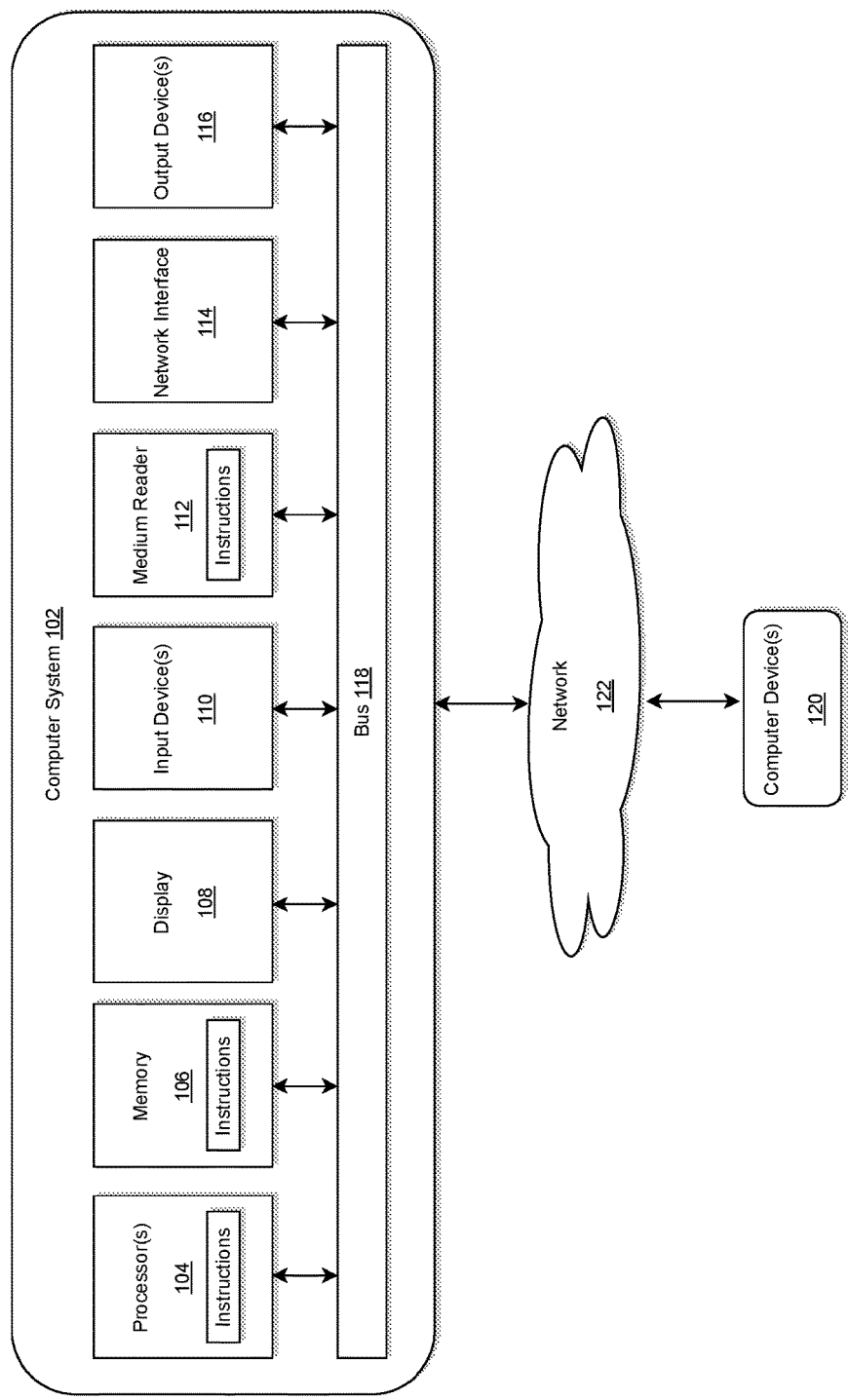
FIG. 1 illustrates a computer system for implementing a platform and language agnostic structured cabling connectivity module configured to provide high speed connectivity for data centers in an automated and scaled fashion in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic structured cabling connectivity module that may be configured to provide high speed connectivity for data centers in an automated and scaled fashion in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the multi-armed bandit connectivity module may be platform and language agnostic that may allow for consistent easy orchestration and passing of data through various components to output a desired result. Since the disclosed process, according to exemplary embodiments, is platform and language agnostic, the multi-armed bandit connectivity module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration-based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionalities as described herein, and a processor described herein may be used to support a virtual processing environment.

Figure 2:
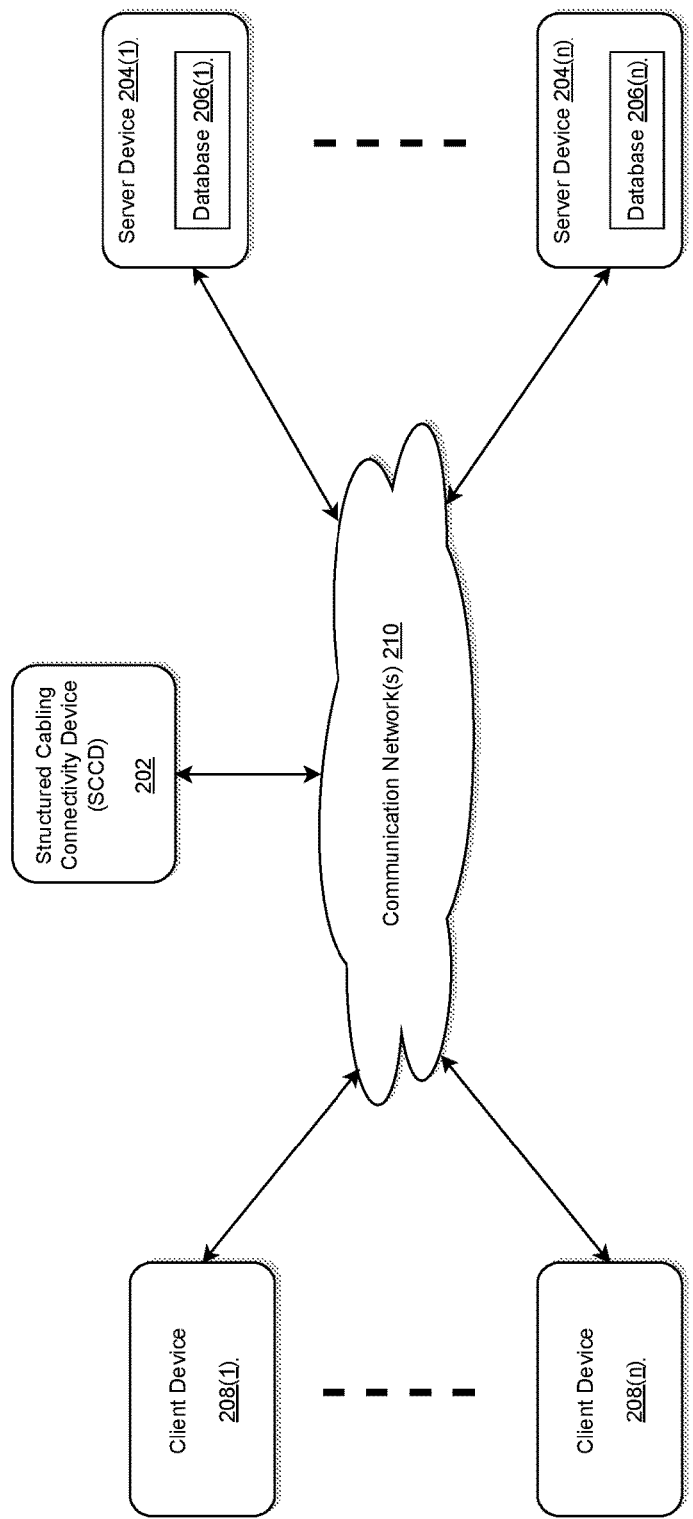
FIG. 2 illustrates an exemplary diagram of a network environment with a platform and language agnostic structured cabling connectivity device in accordance with an exemplary embodiment.

Referring to FIG. 2, a schematic of an exemplary network environment 200 for implementing a platform and language structured cabling connectivity device (SCCD) of the instant disclosure is illustrated.

According to exemplary embodiments, the above-described problems associated with conventional tools may be overcome by implementing an SCCD 202 as illustrated in FIG. 2 that may be configured for applying multi-armed bandit algorithms for providing high speed connectivity for data centers in an automated and scaled fashion, thereby improving structure, control, problem diagnosis, and resiliency for mainframe solutions and allowing robust transmission and reception of data among data centers, but the disclosure is not limited thereto.

The SCCD 202 may be the same or similar to the computer system 102 as described with respect to FIG. 1.

The SCCD 202 may store one or more applications that can include executable instructions that, when executed by the SCCD 202, cause the SCCD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCCD 202 itself, may be located in virtual server(s) running in a cloud-based computing environment rather than being tied to one or more specific physical network computing devices. Also, the application(s) may be running in one or more virtual machines (VMs) executing on the SCCD 202. Additionally, in one or more embodiments of this technology, virtual machine(s) running on the SCCD 202 may be managed or supervised by a hypervisor.

In the network environment 200 of FIG. 2, the SCCD 202 is coupled to a plurality of server devices 204(1)-204(n) that hosts a plurality of databases 206(1)-206(n), and also to a plurality of client devices 208(1)-208(n) via communication network(s) 210. A communication interface of the SCCD 202, such as the network interface 114 of the computer system 102 of FIG. 1, operatively couples and communicates between the SCCD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCCD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCCD 202 may be a standalone device or integrated with one or more other devices or apparatuses, such as one or more of the server devices 204(1)-204(n), for example. In one particular example, the SCCD 202 may be hosted by one of the server devices 204(1)-204(n), and other arrangements are also possible. Moreover, one or more of the devices of the SCCD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SCCD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SCCD 202 that may efficiently provide a platform for implementing a platform and language agnostic structured cabling connectivity module configured to provide high speed connectivity for data centers in an automated and scaled fashion, thereby improving structure, control, problem diagnosis, and resiliency for mainframe solutions and allowing robust transmission and reception of data among data centers, but the disclosure is not limited thereto.

The client devices 208(1)-208(n) may run interface applications, such as standard web browsers or standalone client applications, which may provide an interface to communicate with the SCCD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SCCD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCCD 202, the server devices 204(1)-204(n), or the client devices 208(1)-208(n), for example, may be configured to operate as virtual instances on the same physical machine. For example, one or more of the SCCD 202, the server devices 204(1)-204(n), or the client devices 208(1)-208(n) may operate on the same physical device rather than as separate devices communicating through communication network(s) 210. Additionally, there may be more or fewer SCCDs 202, server devices 204(1)-204(n), or client devices 208(1)-208(n) than illustrated in FIG. 2. According to exemplary embodiments, the SCCD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
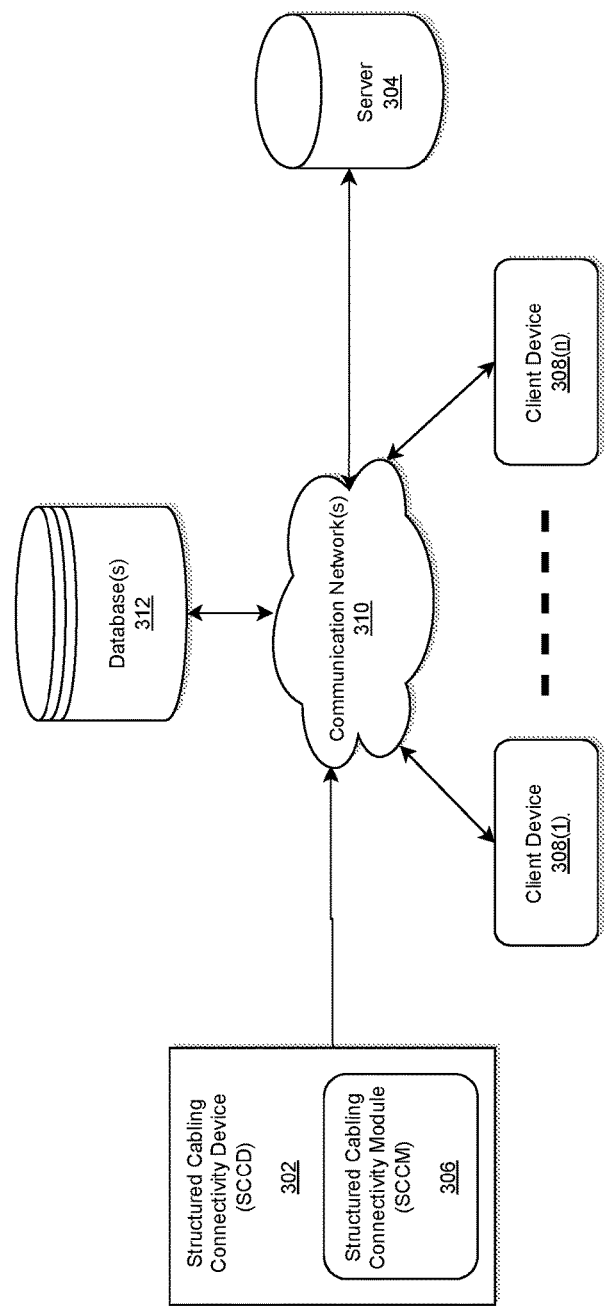
FIG. 3 illustrates a system diagram for implementing a platform and language agnostic structured cabling connectivity device having a platform and language agnostic structured cabling connectivity module in accordance with an exemplary embodiment.

FIG. 3 illustrates a system diagram for implementing an SCCD having a platform and language agnostic structured cabling connectivity module (SCCM) in accordance with an exemplary embodiment.

As illustrated in FIG. 3, the system 300 may include a SCCD 302 within which an SCCM 306 is embedded, a server 304, a database(s) 312, a plurality of client devices 308(1) . . . 308(n), and a communication network 310.

According to exemplary embodiments, the SCCD 302 including the SCCM 306 may be connected to the server 304, and the database(s) 312 via the communication network 310. The database(s) 312 may be located within a plurality of datacenters, each data center being physically located in different building. The SCCD 302 may also be connected to the plurality of client devices 308(1) . . . 308(n) via the communication network 310, but the disclosure is not limited thereto.

According to exemplary embodiment, the SCCD 302 is described and shown in FIG. 3 as including the SCCM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SCCM 306 may be configured to receive real-time feed of data from the plurality of client devices 308(1) . . . 308(n) via the communication network 310.

As will be described below, the SCCM 306 may be configured to: receive requirements and design data for providing a complete end-to-end cabling connection among a plurality of data centers (i.e., database(s) 312) corresponding to a predefined network environment; generate connectivity link data based on the received requirements and design data; identify a first predefined length data for cabling between two hardware components within a same data center zone; identify a second predefined length data for cabling between a hardware component of a first data center zone and a hardware component of a second data center zone; and establish a communication link among the plurality of data centers by implementing the identified first predefined length data and the second predefined length data, but the disclosure is not limited thereto.

The plurality of client devices 308(1) . . . 308(n) are illustrated as being in communication with the SCCD 302. In this regard, the plurality of client devices 308(1) . . . 308(n) may be "clients" (e.g., customers) of the SCCD 302 and are described herein as such. Nevertheless, it is to be known and understood that the plurality of client devices 308(1) . . . 308(n) need not necessarily be "clients" of the SCCD 302, or any entity described in association therewith herein. Any additional or alternative relationship may exist between either or both of the plurality of client devices 308(1) . . . 308(n) and the SCCD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SCCD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The SCCD 302 may be the same or similar to the SCCD 202 as described with respect to FIG. 2, including any features or combination of features described with respect thereto.

Figure 4:
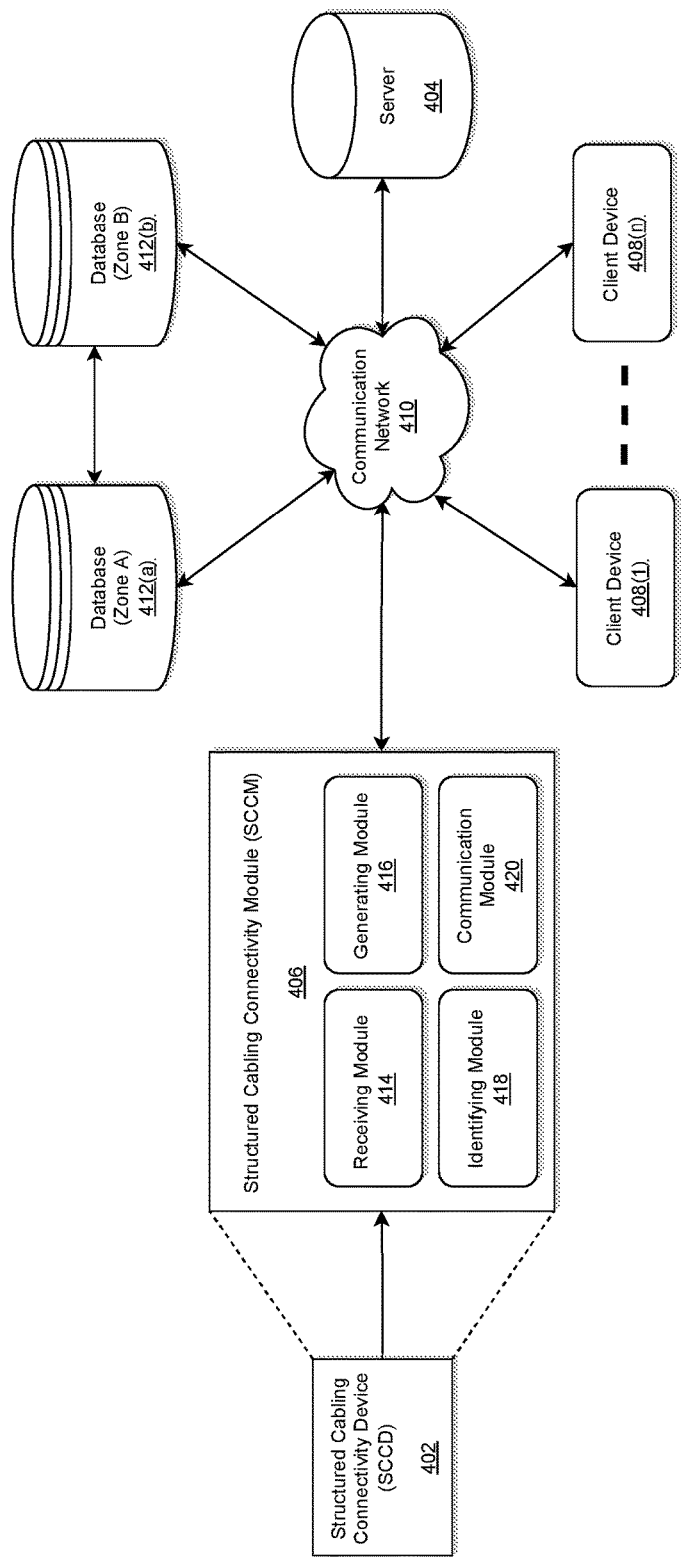
FIG. 4 illustrates a system diagram for implementing a platform and language agnostic structured cabling connectivity module of FIG. 3 in accordance with an exemplary embodiment.

FIG. 4 illustrates a system diagram for implementing an SCCM of FIG. 3 in accordance with an exemplary embodiment.

According to exemplary embodiments, the system 400 may include a platform and language agnostic SCCD 402 within which a platform and language agnostic SCCM 406 is embedded, a server 404, database 412(a) (i.e., Zone A datacenter), database 412(b) (i.e., Zone B datacenter), and a communication network 410.

According to exemplary embodiments, the SCCD 402 including the SCCM 406 may be connected to the server 404 and the databases 412(a), 412(b) via the communication network 410. The SCCD 402 may also be connected to the plurality of client devices 408(1)-408(n) via the communication network 410, but the disclosure is not limited thereto. The SCCM 406, the server 404, the plurality of client devices 408(1)-408(n), the databases 412(a), 412(b), the communication network 410 as illustrated in FIG. 4 may be the same or similar to the SCCM 306, the server 304, the plurality of client devices 308(1)-308(n), the database(s) 312, the communication network 310, respectively, as illustrated in FIG. 3.

According to exemplary embodiments, as illustrated in FIG. 4, the SCCM 406 may include a receiving module 414, a generating module 416, an identifying module 418, and a communication module 420.

According to exemplary embodiments, interactions and data exchange among the receiving module 414, the generating module 416, the identifying module 418 and the communication module 420 may allow scaling the hardware footprints in either horizontally or vertically easily within a hardware-to-hardware clustering network as disclosed herein within the exemplary scope of the present invention.

For example, the receiving module 414 may be configured to receive requirements and design data for providing a complete end-to-end cabling connection among a plurality of data centers corresponding to a predefined network environment. The output (i.e., requirements and design data) from the receiving module 414 may be input to the generating module 416. Upon receiving the output data from the receiving module 414, the generating module may generate connectivity link data based on the received requirements and design data that may be utilized to allow scaling the hardware footprints in either horizontally or vertically within a hardware-to-hardware clustering network as disclosed herein.

Data may then flow from the generating module 416 to the identifying module 418. The identifying module 418 then identifies a first predefined length data for cabling between two hardware components within a same data center zone of the hardware-to-hardware clustering network based on the data received from the generating module 416. The identifying module 418 also identifies a second predefined length data for cabling between a hardware component of a first data center zone and a hardware component of a second data center zone of the hardware-to-hardware clustering network based on the data received from the generating module.

Data regarding the identified first predefined length and the second predefined length from the identifying module 418 may then flow to the communication module 420 which establishes a communication link among the plurality of data centers of the hardware-to-hardware clustering network by implementing the identified first predefined length data and the second predefined length data.

According to exemplary embodiments, each of the receiving module 414, generating module 416, identifying module 418, and the communication module 420 of the SCCM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, generating module 416, identifying module 418, and the communication module 420 of the SCCM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, generating module 416, identifying module 418, and the communication module 420 of the SCCM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, generating module 416, identifying module 418, and the communication module 420 of the SCCM 406 may be called via corresponding API.

The process may be executed via the communication module 420 and the communication network 410, which may comprise plural networks as described above. For example, in an exemplary embodiment, the various components of the SCCM 406 may communicate with the server 404, and the databases 412(a), 412(b) via the communication module 420 and the communication network 410. Of course, these embodiments are merely exemplary and are not limiting or exhaustive.

Figure 5:
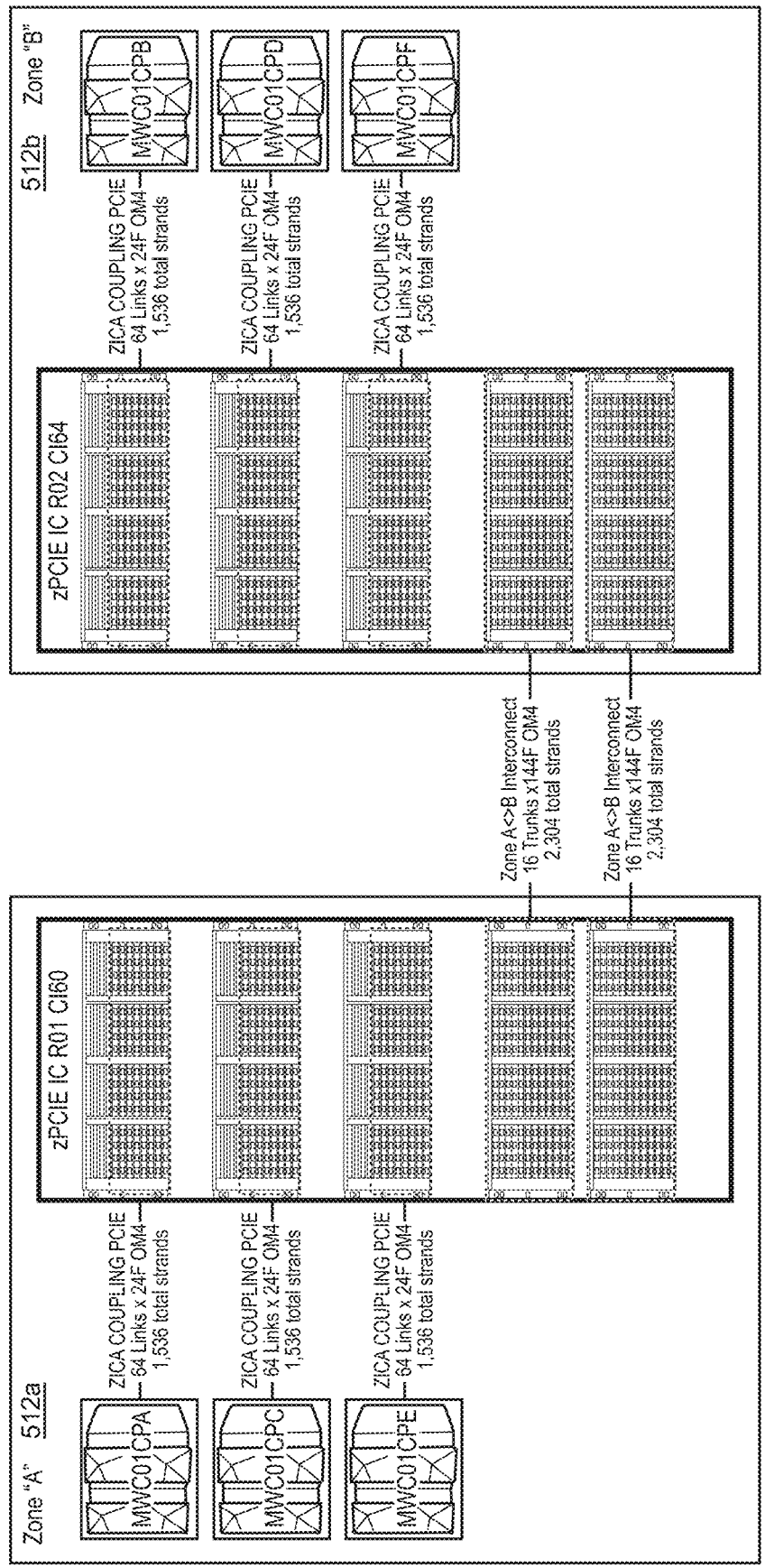
FIG. 5 illustrates an exemplary connectivity architecture implemented by the platform and language agnostic structured cabling connectivity module of FIG. 4 in accordance with an exemplary embodiment.

FIG. 5 illustrates an exemplary connectivity architecture 500 implemented by the platform and language agnostic SCCM 406 of FIG. 4 in accordance with an exemplary embodiment. As illustrated in FIG. 5, the exemplary connectivity architecture 500 may include a first data center zone (Zone A) 512a and a second data center zone (Zone B) 512b. The cabling solution implemented by the SCCM 406 of FIG. 4 may utilize a "Y-Adaptor" cable that takes a 24F connector at the device end (i.e., mainframe central electronic complex (CEC)) and covers it into 2×12F connections.

Multi-fiber push on connectors, or MPOs for short, are fiber connectors comprised of multiple optical fibers. While defined as an array connector having more than 2 fibers, MPO connectors are typically available with 8, 12 or 24 fibers for common data center and LAN applications. Other fiber counts are available such as 32, 48, 60 or even 72 fibers, but these are typically used for specialty super high-density multi-fiber arrays in large scale optical switches.

According to exemplary embodiments, one purpose of the "Y-Adaptor" cable is to convert 24F into 12F pairs to be compatible with 12F MPO solutions for patching and achieve the lowest mated pair dB loss.

As illustrated in FIG. 5, according to exemplary embodiments, a total of six z14 mainframe CECs makeup the zATE CECs (MWC01CPA, MWC01CPC, MWC01CPE). To mimic the configuration in a new data center of a physical location of the CECs, according to exemplary embodiments, Zone A 512a may include three of the six zATE CECs (MWC01CPA, MWC01CPC, MWC01CPE) and Zone B 512b may include three of the six zATE CECs (MWC01CPA, MWC01CPC, MWC01CPE); links between CECs in the same zone may be referred to as "Local" and may have a total length of 85 meters of cabling and two mates pairs, but the disclosure is not limited thereto; and links between CECs in the opposite zone may be referred to as "Remote" and may have a total length of 135 meters of cabling and four mates pairs, but the disclosure is not limited thereto.

For example, referring back to FIGS. 4 and 5, according to exemplary embodiments, the receiving module 414 may be configured to receive requirements and design data for providing a complete end-to-end cabling connection among a plurality of data centers (e.g., Zone A 512a and Zone B 512b) corresponding to a predefined network environment (i.e., mainframe network environment). The generating module 416 may be configured to generate connectivity link data based on the received requirements and design data. The identifying module 418 may be configured to identify a first predefined length data for cabling between two hardware components within a same data center zone (i.e., components within either Zone A 512a or Zone B 512b). The identifying module 418 may also be configured to identify a second predefined length data for cabling between a hardware component of a first data center zone (Zone A 512a) and a hardware component of a second data center zone (Zone B 512b). The communication module 420 may be configured to establish a communication link among the plurality of data centers (e.g., Zone A 512a and Zone B 512b) by implementing the identified first predefined length data and the second predefined length data.

According to exemplary embodiments, the predefined network environment may be a mainframe network environment for supporting mainframe systems, but the disclosure is not limited thereto.

According to exemplary embodiments, the requirements and design data may include data related to connection procedures, topologies and channel certifications of connection length of cables required to provide the complete end-to-end cabling connection among the plurality of data centers e.g., Zone A 512a and Zone B 512b), but the disclosure is not limited thereto.

According to exemplary embodiments, the first predefined length data for cabling may be 85 meters of total length of cabling, but the disclosure is not limited thereto.

According to exemplary embodiments, a link between hardware components within the same data center zone may include two mated pairs, but the disclosure is not limited thereto.

According to exemplary embodiments, the second first predefined length data for cabling may be 130 meters of total length of cabling, but the disclosure is not limited thereto.

According to exemplary embodiments, a link between the hardware component of the first data center zone and the hardware component of the second data center zone may include four mated pairs, but the disclosure is not limited thereto.

According to exemplary embodiments, the first data center zone and the second data center zone may be physically separated in different buildings.

Figure 6:
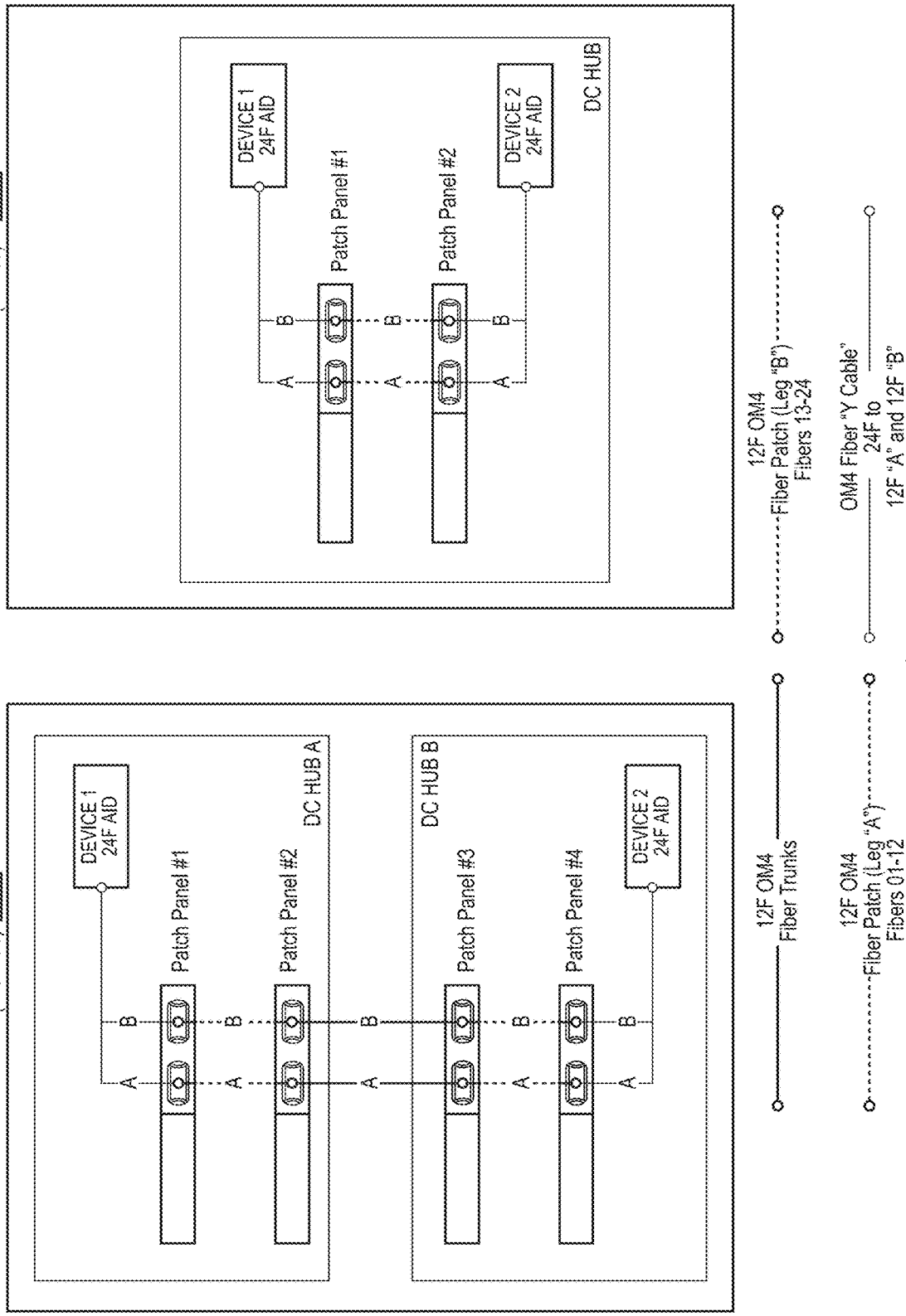
FIG. 6 illustrates an exemplary connection pairs implemented by the platform and language agnostic structured cabling connectivity module of FIG. 4 in accordance with an exemplary embodiment.

FIG. 6 illustrates an exemplary connection pairs architecture 600 implemented by the platform and language agnostic SCCM 406 of FIG. 4 in accordance with an exemplary embodiment. As illustrated in FIG. 6, the exemplary connection pairs architecture 600 includes a four-mated pair for inter hub connection (e.g., between connection of a component of Zone A and a component of Zone B as illustrated in FIG. 5); and a two-mated pair for intra hub connection (e.g., connection of components within the same zone). FIG. 6 illustrates exemplary architecture 600 depicting both topologies to be implemented by SSCM 406 in a new data center (long links or "inter hub" 602a and short links or "intra hub" 602b).

For example, as illustrated in FIG. 6, according to exemplary embodiments, coupling physical channel may include coupling of Device "1" (zCEC) to Device "2" (zCEC). Alternatively, zHyperlink physical channel may include coupling of Device "1" (zCEC) to Device "2" (DS*K). According to exemplary embodiments, a physical channel may contain both fiber leg "A" and fiber leg "B" between Device "1" and Device "2".

According to exemplary embodiments, the SSCM 406 of FIG. 4 may implement the "Y-cable" on a physical channel to breakout the 24 fiber device channel into a pair of 12 fiber legs. For example, the SSCM 406 of FIG. 4 may implement up to two "Y cables", i.e., one at Device "1" and one at Device "2".

According to exemplary embodiments, the SSCM 406 of FIG. 4 may implement the 12F MPO patch panels (12F mated pair points) on the physical channel. For example, the SSCM 406 of FIG. 4 may implement up to four patch panels or mated pair points within the physical channel.

According to exemplary embodiments, the aggregate physical cable length of all components between Device "1" and Device "2" should be exceed 135 meters as tested for optimum network functions.

Figure 7:
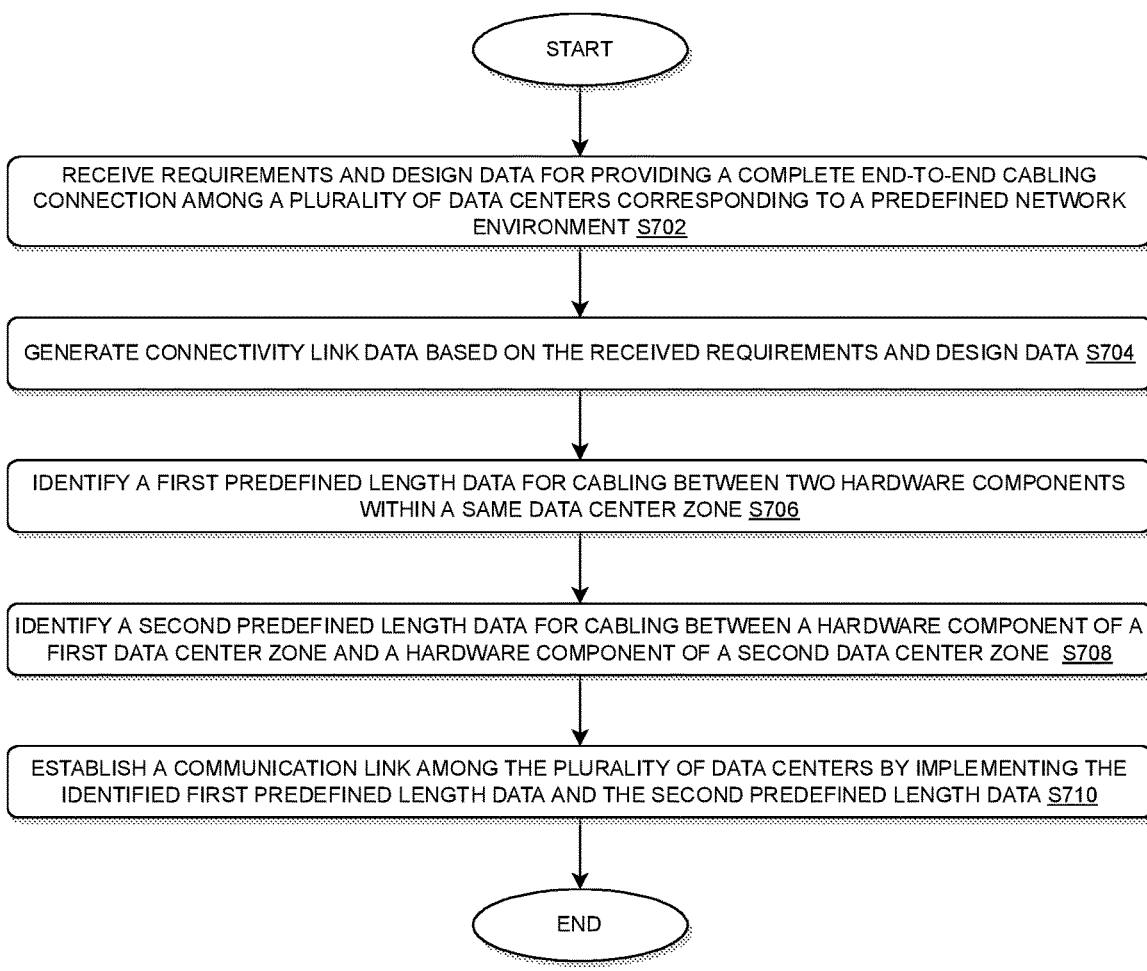
FIG. 7 illustrates an exemplary flow chart implemented by the platform and language agnostic structured cabling connectivity module of FIG. 4 for providing high speed connectivity for data centers in an automated and scaled fashion in accordance with an exemplary embodiment.

FIG. 7 illustrates an exemplary flow chart of a process 700 implemented by the platform and language agnostic SCCM 406 of FIG. 4 for providing high speed connectivity for data centers in an automated and scaled fashion in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include receiving requirements and design data for providing a complete end-to-end cabling connection among a plurality of data centers corresponding to a predefined network environment.

At step S704, the process 700 may include generating connectivity link data based on the received requirements and design data.

At step S706, the process 700 may include identifying a first predefined length data for cabling between two hardware components within a same data center zone.

At step S708, the process 700 may include identifying a second predefined length data for cabling between a hardware component of a first data center zone and a hardware component of a second data center zone.

At step S710, the process 700 may include establishing a communication link among the plurality of data centers by implementing the identified first predefined length data and the second predefined length data.

According to exemplary embodiments, in the process 700, the predefined network environment may be a mainframe network environment for supporting mainframe systems, but the disclosure is not limited thereto.

According to exemplary embodiments, in the process 700, the requirements and design data may include data related to connection procedures, topologies and channel certifications of connection length of cables required to provide the complete end-to-end cabling connection among the plurality of data centers, but the disclosure is not limited thereto.

According to exemplary embodiments, in the process 700, the first predefined length data for cabling may be 85 meters of total length of cabling, but the disclosure is not limited thereto.

According to exemplary embodiments, in the process 700, a link between hardware components within the same data center zone may include two mated pairs, but the disclosure is not limited thereto.

According to exemplary embodiments, in the process 700, the second first predefined length data for cabling may be 130 meters of total length of cabling, but the disclosure is not limited thereto.

According to exemplary embodiments, in the process 700, a link between the hardware component of the first data center zone and the hardware component of the second data center zone may include four mated pairs, but the disclosure is not limited thereto.

According to exemplary embodiments, in the process 700, the first data center zone and the second data center zone may be physically separated in different buildings.

According to exemplary embodiments, the SCCD 402 may include a memory (e.g., a memory 106 as illustrated in FIG. 1) which may be a non-transitory computer readable medium that may be configured to store instructions for implementing a SCCM 406 for providing high speed connectivity for data centers in an automated and scaled fashion, thereby improving structure, control, problem diagnosis, and resiliency for mainframe solutions and allowing robust transmission and reception of data among data centers as disclosed herein. The SCCD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SCCM 406 or within the SCCD 402, may be used to perform one or more of the methods and processes as described herein. In a particular embodiment, the instructions may reside completely, or at least partially, within the memory 106, the medium reader 112, and/or the processor 104 (see FIG. 1) during execution by the SCCD 402.

According to exemplary embodiments, the instructions, when executed, may cause a processor embedded within the SCCM 406 or the SCCD 402 to perform the following: receiving requirements and design data for providing a complete end-to-end cabling connection among a plurality of data centers corresponding to a predefined network environment; generating connectivity link data based on the received requirements and design data; identifying a first predefined length data for cabling between two hardware components within a same data center zone; identifying a second predefined length data for cabling between a hardware component of a first data center zone and a hardware component of a second data center zone; and establishing a communication link among the plurality of data centers by implementing the identified first predefined length data and the second predefined length data. According to exemplary embodiments, the processor may be the same or similar to the processor 104 as illustrated in FIG. 1 or the processor embedded within SCCD 202, SCCD 302, SCCD 402, and SCCM 406.

Figure 8:
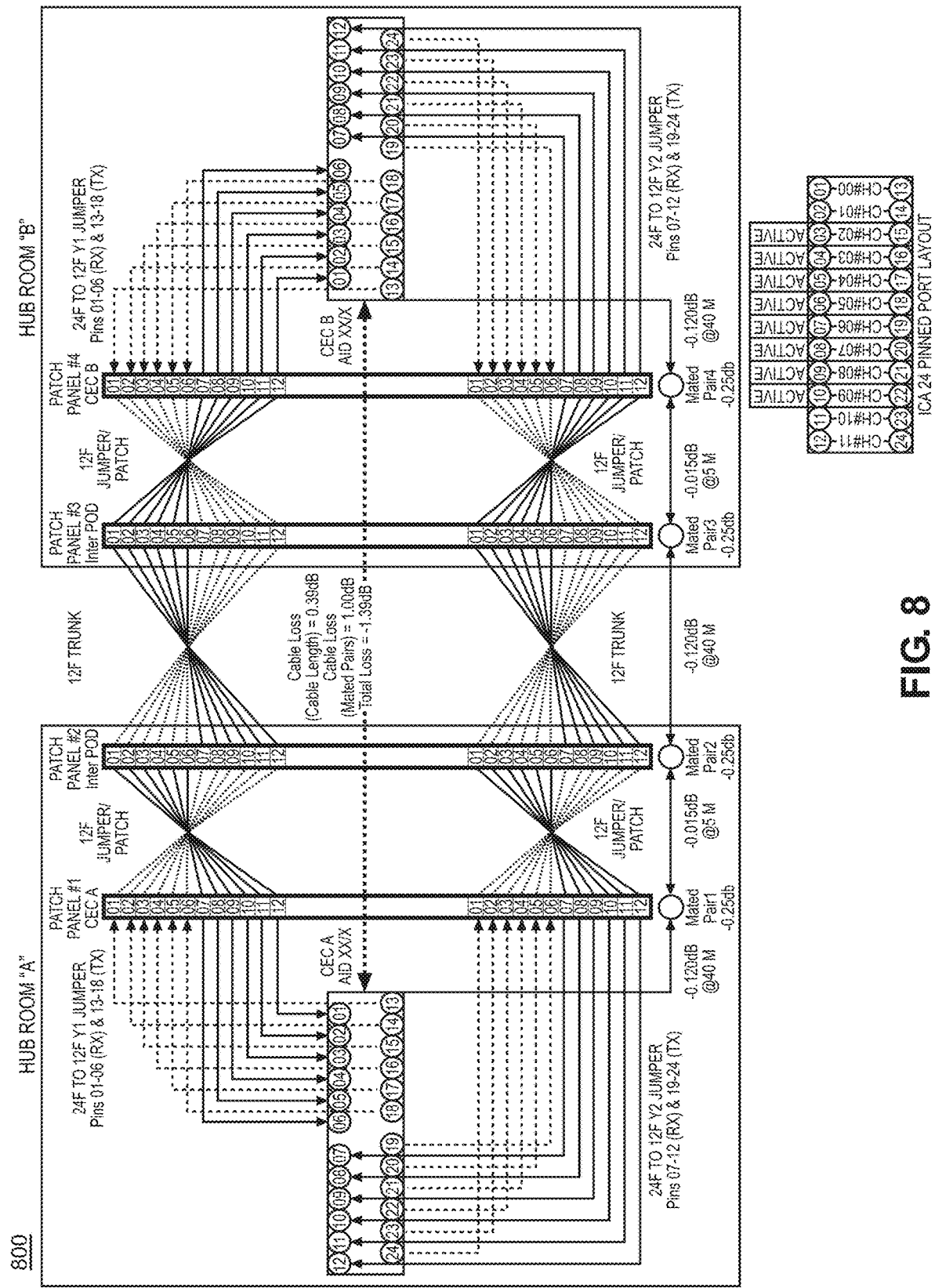
FIG. 8 illustrates an exemplary architecture diagram of cable pinning implemented by the platform and language agnostic structured cabling connectivity module of FIG. 4 in accordance with an exemplary embodiment.

FIG. 8 illustrates an exemplary architecture diagram 800 of cable pinning implemented by the platform and language agnostic SCCM 406 of FIG. 4 in accordance with an exemplary embodiment. As illustrated in the architecture diagram 800, the SCCM 406 implements the cable pinning of 24F to 2×12 F Y-cable pinning, but the disclosure is not limited thereto.

Figure 9:
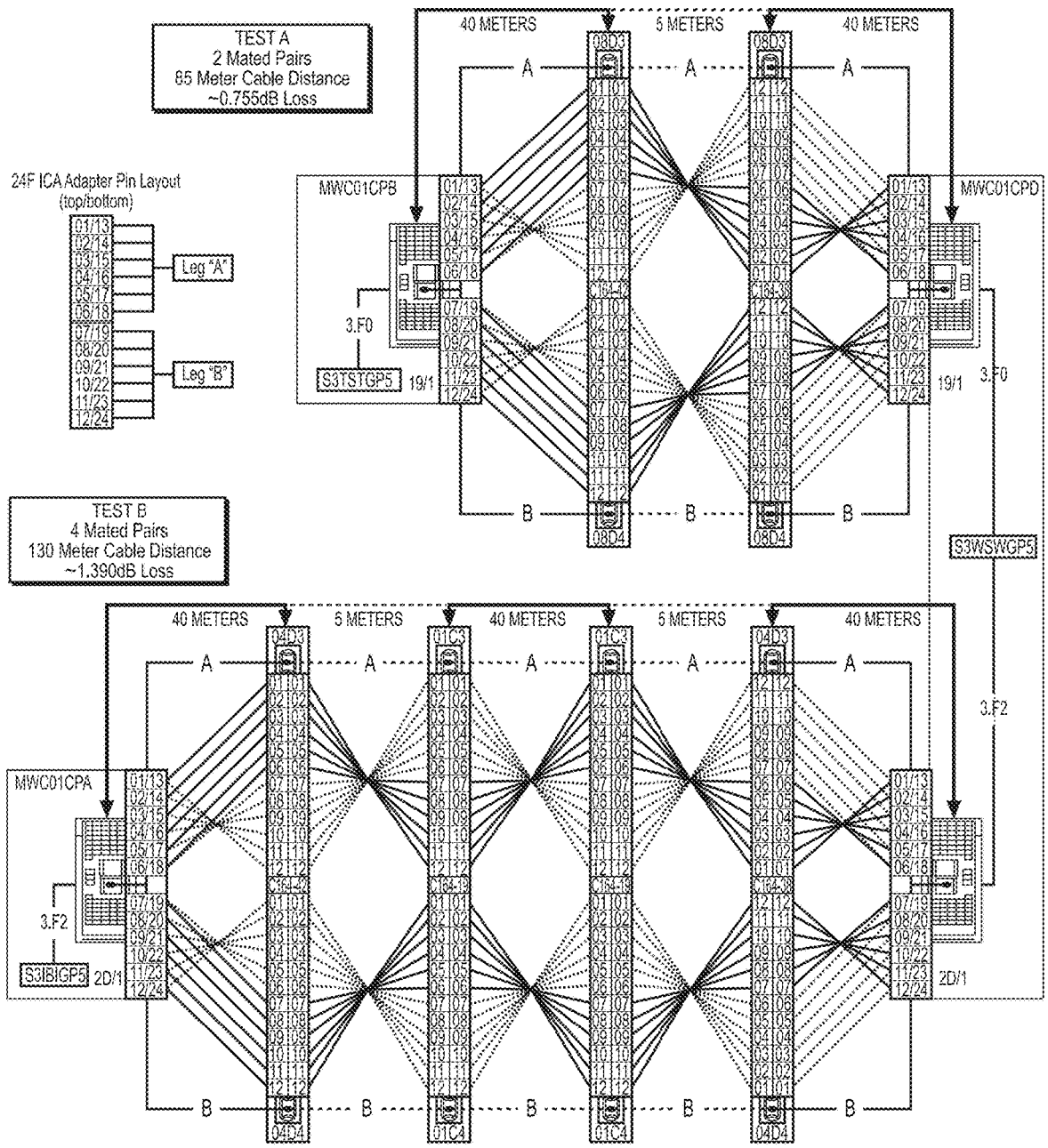
FIG. 9 illustrates an exemplary test overview implemented by the platform and language agnostic structured cabling connectivity module of FIG. 4 in accordance with an exemplary embodiment.

FIG. 9 illustrates an exemplary test overview 900 implemented by the platform and language agnostic SCCM 406 of FIG. 4 in accordance with an exemplary embodiment. The exemplary test overview 900 includes the two physical end-to-end links that are tested by the SCCM 406.

Figure 10:
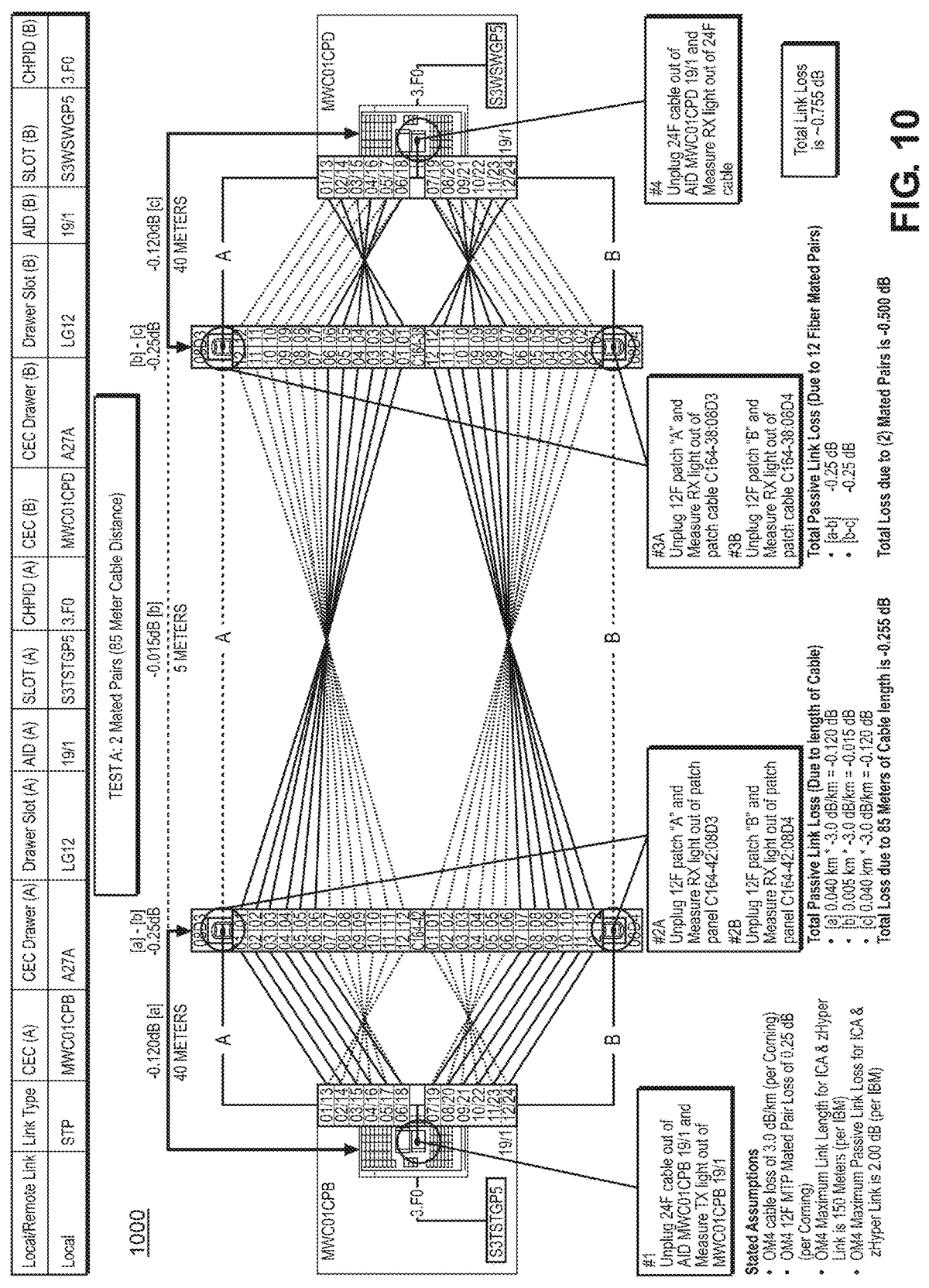

FIG. 10 illustrates an exemplary first test 1000 of the test overview 900 of FIG. 9 implemented by the platform and language agnostic SCCM 406 of FIG. 4 in accordance with an exemplary embodiment. As illustrated in the first test 1000 (Test A), two (2) mated pairs were utilized by the SCCM 406 having eighty-five (85) cable distance. The first test 1000 resulted in approximately −0.255 dB total loss due to 85 meters of cable length and approximately −0.500 dB total loss due to 2 mated pairs. Thus, the first test 1000 resulted in approximately 0.755 dB total link loss.

Figure 11:
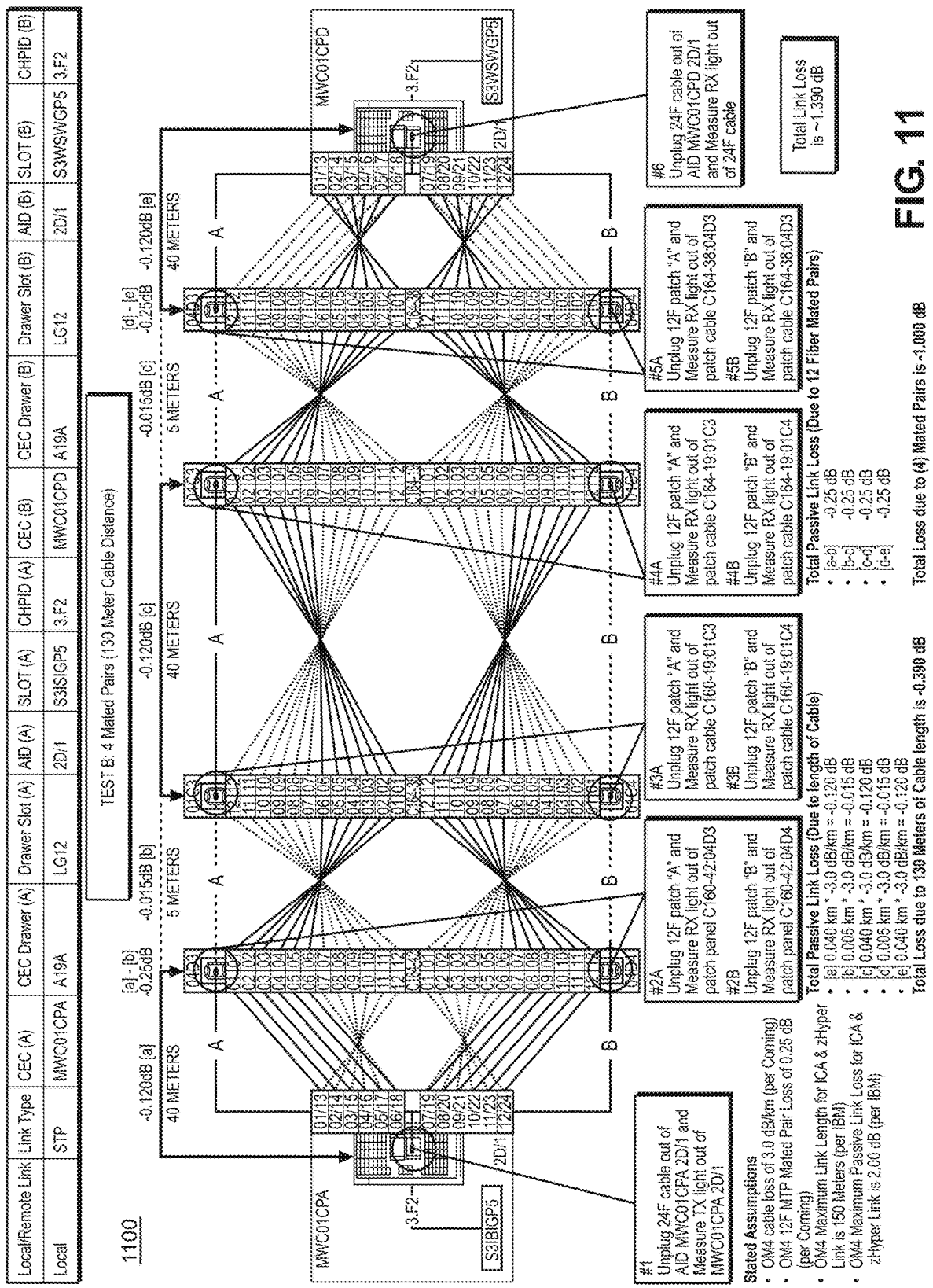
FIG. 11 illustrates an exemplary second test of the test overview of FIG. 9 implemented by the platform and language agnostic structured cabling connectivity module of FIG. 4 in accordance with an exemplary embodiment.

FIG. 11 illustrates an exemplary second test 1100 of the test overview 900 of FIG. 9 implemented by the platform and language agnostic SCCM 406 of FIG. 4 in accordance with an exemplary embodiment. As illustrated in the second test 1100 (Test B), four (4) mated pairs were utilized by the SCCM 406 having one-hundred thirty (130) meters of cable distance. The second test 1100 resulted in approximately −0.390 dB total loss due to 130 meters of cable length and approximately −1.000 dB total loss due to 4 mated pairs. Thus, the second test 1100 resulted in approximately 1.390 dB total link loss.

According to exemplary embodiments as disclosed above in FIGS. 1-7, technical improvements effected by the instant disclosure may include a platform for implementing a platform and language agnostic structured cabling connectivity module configured to provide high speed connectivity for data centers in an automated and scaled fashion, thereby improving structure, control, problem diagnosis, and resiliency for mainframe solutions and allowing robust transmission and reception of data among data centers, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a structured cabling connectivity module for providing high-speed data connectivity by utilizing one or more processors along with allocated memory, the method comprising:
    receiving requirements and design data for providing a complete end-to-end cabling connection among a plurality of data centers corresponding to a predefined network environment;
    generating connectivity link data based on the received requirements and design data;
    identifying a first predefined length data for cabling between two hardware components within a same data center zone;
    identifying a second predefined length data for cabling between a hardware component of a first data center zone and a hardware component of a second data center zone; and
    establishing a communication link among the plurality of data centers by implementing the identified first predefined length data and the second predefined length data.

2. The method according to claim 1, wherein the predefined network environment is a mainframe network environment for supporting mainframe systems.

3. The method according to claim 1, wherein the requirements and design data includes data related to connection procedures, topologies and channel certifications of connection length of cables required to provide the complete end-to-end cabling connection among the plurality of data centers.

4. The method according to claim 1, wherein the first predefined length data for cabling is 85 meters of total length of cabling.

5. The method according to claim 4, wherein a link between hardware components within the same data center zone includes two mated pairs.

6. The method according to claim 1, wherein the second first predefined length data for cabling is 130 meters of total length of cabling.

7. The method according to claim 6, wherein a link between the hardware component of the first data center zone and the hardware component of the second data center zone includes four mated pairs.

8. The method according to claim 1, wherein the first data center zone and the second data center zone are physically separated in different buildings.

9. A system for implementing a structured cabling connectivity module for providing high-speed data connectivity, the system comprising:
    a processor; and
    a memory operatively connected to the processor via a communication interface, the memory storing computer readable instructions, when executed, causes the processor to:
    receive requirements and design data for providing a complete end-to-end cabling connection among a plurality of data centers corresponding to a predefined network environment;
    generate connectivity link data based on the received requirements and design data;
    identify a first predefined length data for cabling between two hardware components within a same data center zone;
    identify a second predefined length data for cabling between a hardware component of a first data center zone and a hardware component of a second data center zone; and
    establish a communication link among the plurality of data centers by implementing the identified first predefined length data and the second predefined length data.

10. The system according to claim 9, wherein the predefined network environment is a mainframe network environment for supporting mainframe systems.

11. The system according to claim 9, wherein the requirements and design data includes data related to connection procedures, topologies and channel certifications of connection length of cables required to provide the complete end-to-end cabling connection among the plurality of data centers.

12. The system according to claim 9, wherein the first predefined length data for cabling is 85 meters of total length of cabling.

13. The system according to claim 12, wherein a link between hardware components within the same data center zone includes two mated pairs.

14. The system according to claim 9, wherein the second first predefined length data for cabling is 130 meters of total length of cabling.

15. The system according to claim 14, wherein a link between the hardware component of the first data center zone and the hardware component of the second data center zone includes four mated pairs.

16. The system according to claim 9, wherein the first data center zone and the second data center zone are physically separated in different buildings.

17. A non-transitory computer readable medium configured to store instructions for implementing a structured cabling connectivity module for providing high-speed data connectivity, wherein, when executed, the instructions cause a processor to perform the following:

receiving requirements and design data for providing a complete end-to-end cabling connection among a plurality of data centers corresponding to a predefined network environment;

generating connectivity link data based on the received requirements and design data;

identifying a first predefined length data for cabling between two hardware components within a same data center zone;

identifying a second predefined length data for cabling between a hardware component of a first data center zone and a hardware component of a second data center zone; and establishing a communication link among the plurality of data centers by implementing the identified first predefined length data and the second predefined length data.

18. The non-transitory computer readable medium according to claim 17, wherein the predefined network environment is a mainframe network environment for supporting mainframe systems.

19. The non-transitory computer readable medium according to claim 17, wherein the requirements and design data includes data related to connection procedures, topologies and channel certifications of connection length of cables required to provide the complete end-to-end cabling connection among the plurality of data centers.

20. The non-transitory computer readable medium according to claim 17, wherein the first predefined length data for cabling is 85 meters of total length of cabling.

* * * * *